(12) United States Patent
Kim (10) Patent No.: US 10,486,915 B2
(45) Date of Patent: Nov. 26, 2019

(54) AUTOMATED ARTICLE SINGULATOR AND METHOD THEREOF

(71) Applicant: Gachisoft Inc., Daejeon, Yuseong-gu (KR)

(72) Inventor: Hoyon Kim, Sejong (KR)

(73) Assignee: Gachisoft Inc., Daejeon (KR)

( * ) Notice: Subject to any disclaimer, the term of this patent is extended or adjusted under 35 U.S.C. 154(b) by 23 days.

(21) Appl. No.: 15/928,834

(22) Filed: Mar. 22, 2018

(65) Prior Publication Data

US 2018/0215552 A1    Aug. 2, 2018

(30) Foreign Application Priority Data

Jan. 23, 2017   (KR) .................. 10-2017-0010545

(51) Int. Cl.
| | | |
|---|---|---|
| *B65G 37/00* | (2006.01) | |
| *B65G 43/10* | (2006.01) | |
| *B65G 47/24* | (2006.01) | |
| *B65G 47/14* | (2006.01) | |
| *B65G 47/68* | (2006.01) | |

(52) U.S. Cl.
CPC ......... *B65G 47/1492* (2013.01); *B65G 47/24* (2013.01); *B65G 47/682* (2013.01); *B65G 2201/0285* (2013.01)

(58) Field of Classification Search
CPC ........ B65G 37/00; B65G 43/10; B65G 47/24; B65G 47/682; B65G 47/1492
USPC ............................ 198/394, 395, 502.2, 502.3
See application file for complete search history.

(56) References Cited

U.S. PATENT DOCUMENTS

| | | | | |
|---|---|---|---|---|
| 3,679,043 A * | 7/1972 | Becker | ................... | B65G 13/10 193/35 MD |
| 5,145,049 A * | 9/1992 | McClurkin | .......... | B65G 47/086 198/374 |
| 6,073,747 A * | 6/2000 | Takino | ................... | B65G 13/10 198/370.09 |
| 6,694,220 B1 * | 2/2004 | Tanz | .................... | B65G 1/0478 198/369.4 |
| 7,040,478 B2 * | 5/2006 | Ehlert | .................... | B65G 13/10 198/369.4 |
| 7,344,018 B2 * | 3/2008 | Costanzo | ............... | B65G 17/24 198/779 |
| 7,506,751 B2 * | 3/2009 | Fourney | ................. | B65G 17/24 198/370.09 |

(Continued)

FOREIGN PATENT DOCUMENTS

| | | |
|---|---|---|
| JP | 2006-504597 A | 2/2006 |
| JP | 2010-100398 A | 5/2010 |

(Continued)

*Primary Examiner* — Douglas A Hess
(74) *Attorney, Agent, or Firm* — NSIP Law (57) ABSTRACT

Disclose herein are an automated article singulator and a method thereof. The singulator according to one embodiment includes a measuring unit configured to measure positions and postures of articles being transferred, an arranging unit configured to receive randomly supplied articles, transfer the articles using a transfer apparatus, and change moving directions of the articles using a plurality of direction changing apparatuses, and a control unit configured to control the direction changing apparatuses one at a time or in groups to arrange flows of the articles according to information measured by the measuring unit.

22 Claims, 8 Drawing Sheets

(56) References Cited

U.S. PATENT DOCUMENTS

| | | | | |
|---|---|---|---|---|
| 7,854,314 B2* | 12/2010 | Pelak | ................... | B65G 47/31 |
| | | | | 198/572 |
| 7,861,849 B2* | 1/2011 | Fourney | ................ | B65G 13/10 |
| | | | | 198/453 |
| 8,060,243 B2* | 11/2011 | Ogawa | .................. | B65G 43/08 |
| | | | | 198/358 |
| 8,061,506 B2* | 11/2011 | Schafer | ................. | B65G 43/08 |
| | | | | 198/444 |
| 8,201,681 B2* | 6/2012 | Schiesser | .............. | B65G 43/08 |
| | | | | 198/460.1 |
| 8,240,461 B2* | 8/2012 | Asano | ................ | B65G 47/5145 |
| | | | | 198/502.1 |
| 8,360,230 B2* | 1/2013 | Rompe | ................. | G06T 7/0004 |
| | | | | 198/358 |
| 8,805,585 B2* | 8/2014 | Nishihara | .............. | B25J 9/0093 |
| | | | | 198/339.1 |
| 9,038,810 B2* | 5/2015 | Schroader | ............. | B65G 47/22 |
| | | | | 198/413 |
| 9,221,622 B2* | 12/2015 | Morency | ............ | B65G 41/002 |
| 9,745,143 B2* | 8/2017 | Wilkins | .............. | B65G 39/025 |
| 2004/0104100 A1 | 6/2004 | Schiesser et al. | | |
| 2006/0283689 A1 | 12/2006 | Schiesser et al. | | |
| 2011/0022221 A1 | 1/2011 | Fourney | | |
| 2016/0221762 A1* | 8/2016 | Schroader | | |
| 2018/0339865 A1* | 11/2018 | Schroader | | |

FOREIGN PATENT DOCUMENTS

| | | |
|---|---|---|
| KR | 10-2010-0078064 A | 7/2010 |
| KR | 10-2012-0089636 A | 8/2012 |

* cited by examiner

AUTOMATED ARTICLE SINGULATOR AND METHOD THEREOF

CROSS-REFERENCE TO RELATED APPLICATION

This application claims priority to and the benefit of Korean Patent Application No. 10-2017-0010545, filed on Jan. 23, 2017, the disclosure of which is incorporated herein by reference in its entirety.

BACKGROUND

1. Field of the Invention

The present invention relates to a logistics technology, and more particularly, to an article transfer technology using a transfer apparatus.

2. Discussion of Related Art

A demand for high-speed article processing has been increasing due to growth of a courier market and establishment of a hub-type logistics center. Article processing in a logistics center is evolving from partial automation to full automation. Therefore, there is a growing demand for a singulator which automatically arranges articles.

Even when a parcel separator is used in a case in which there are no singulators, articles should be dropped at regular intervals and placed on a conveyor belt one at a time. Since all such operations are manually performed, a considerable amount of manpower and time are required in a logistics center. To reduce the number of manual operations and realize full automation, an automated system capable of sequentially arranging articles one at a time and inputting the articles into the article separator even when the articles are roughly poured. To realize the full automation, a processing method, in which a whole pallet is poured using a tipper instead of articles being manually placed on a separator and the articles are arranged into a row, sent to the separator, and processed by the separator, is required.

SUMMARY OF THE INVENTION

The present invention is directed to a high efficiency automated article singulator which is more intelligently operated in a small space by adding a software technology into hardware, and a method thereof.

According to an aspect of the present invention, there is provided a singulator including a measuring unit configured to measure positions and postures of articles being transferred, an arranging unit configured to receive randomly supplied articles, transfer the articles using a transfer apparatus, and change moving directions of the articles using a plurality of direction changing apparatuses, and a control unit configured to control the direction changing apparatuses one at a time or in groups to arrange flows of the articles according to information measured by the measuring unit.

The control unit may include an article control unit configured to determine the moving directions of the articles using the information measured by the measuring unit to sequentially arrange and discharge the articles, a direction changing control unit configured to control direction changing of the direction changing apparatuses one at a time or in groups to move the articles in the determined moving directions, and a transfer speed control unit configured to control a transfer speed of the transfer apparatus for an arrangement.

The article control unit may extract an input order of the articles and distances between the articles from position information of the articles measured by the measuring unit and determine the moving directions of the articles using the extracted information. Here, the article control unit may prevent the articles from colliding into each other by changing a moving direction of a first article being transferred along the transfer apparatus into a first direction and changing a moving direction of a second article positioned within a preset distance from the first article into a second direction.

The article control unit may arrange the moving directions of the articles according to the positions of the articles such that, after the arranging unit is divided into a plurality of rows, articles positioned within a first region in a direction perpendicular to a transfer direction are moved along a first row of the arranging unit and articles positioned within a second region adjacent to the first region in the direction perpendicular to the transfer direction are moved along a second row of the arranging unit.

The article control unit may determine the moving directions of the articles to laterally spread the articles and arrange the articles according to the positions of the articles. The article control unit may change the postures of the articles into preset postures for when the articles are transferred, and arrange the articles.

Each of the direction changing apparatuses may include a roller configured to rotate and change a direction to a direction inclined from or perpendicular to a running direction of the transfer apparatus. Each of the direction changing apparatuses may include at least one wheel configured to be rollable, and a rotating body configured to change a direction of the at least one wheel to move the articles in a direction inclined from or perpendicular to a running direction of the transfer apparatus.

The measuring unit may include an image capturing unit configured to capture images of the articles, and an image recognition unit configured to recognize the positions and the postures of the articles from the captured images. The measuring unit may further include a position detecting unit configured to detect a transfer position of the article on the transfer apparatus.

The singulator may further include a feeding unit configured to randomly supply the articles to the transfer apparatus, and the control unit may perform control such that, when the number of expected discharged articles in consideration of sizes and the number of supplied articles is greater than a preset maximum number of discharged articles, a speed of the transfer apparatus is decreased in order to decrease the number of articles supplied per unit time, and when the number of expected discharged articles is less than a preset minimum number of discharged articles, the speed of the transfer apparatus is increased in order to increase the number of articles supplied per unit time.

The singulator may further include, when the arranging unit divides the articles into the two or more rows and arranges articles in a first order, a coupling unit configured to couple the articles arranged in the two or more rows into one row and arrange the articles in a final order. The coupling unit may divide the transfer apparatus into a plurality of transfer apparatuses in rows, drive the transfer apparatuses at different transfer speeds, and arrange the articles into a row.

According to an aspect of the present invention, there is provided an automated article singulating method including receiving, by a singulator, randomly supplied articles and transferring the articles using a transfer apparatus, measuring positions and postures of the articles being transferred, and arranging flows of the articles by controlling direction changing apparatuses one at a time or in groups according to the measured information;

The arranging of the flows of the articles may include determining moving directions of the articles using the measured information to sequentially arrange and discharge the articles, controlling direction changing of the direction changing apparatuses one at a time or in groups to move the articles in the determined moving direction, and controlling a transfer speed of the transfer apparatus for an arrangement.

The determining of the moving directions of the articles may include extracting an input order of the articles and distances between the articles from the measured position information of articles, and determining the moving directions of the articles using the extracted information.

The determining of the moving directions of the articles may include dividing the transfer apparatus into a plurality of rows, moving articles positioned within a first region in a direction perpendicular to a transfer direction along a first row according positions of the articles, and moving articles positioned within a second region adjacent to the first region in the direction perpendicular to the transfer direction along a second row.

The determining of the moving directions of the articles may include determining the moving directions of the articles to laterally spread the articles and arrange the articles according to the positions of the articles. The determining of the moving directions of the articles may include changing the postures of the articles into preset postures for when the articles are transferred and arranging the articles.

The automated article singulating method may further include randomly supplying the articles to the transfer apparatus, and performing control such that, when the number of expected discharged articles in consideration of sizes and the number of supplied articles is greater than a preset maximum number of discharged articles, a speed of the transfer apparatus is decreased in order to decrease the number of articles supplied per unit time, and when the number of expected discharged articles is less than a preset minimum number of discharged articles, the speed of the transfer apparatus is increased in order to increase the number of articles supplied per unit time.

The automated article singulating method may further include coupling the articles arranged in two or more lines into one row and arranging the articles in a final discharge order.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same should be clearly understood with reference to the accompanying drawings and the following detailed embodiments. However, the present invention is not limited to the embodiments to be disclosed, and may be implemented in various different forms. The embodiments are provided in order to fully explain the present invention and fully explain the scope of the present invention to those skilled in the art. The scope of the present invention is defined by the appended claims. Like reference numerals denote like elements throughout the specification In the description of the present invention, when it is determined that detailed descriptions of related well-known functions unnecessarily obscure the gist of the present invention, the detailed descriptions will be omitted. In addition, some terms described below are defined in consideration of functions in the present invention, and meanings thereof may vary depending on, for example, a user or operator's intentions or customs. Therefore, the meanings of terms should be interpreted on the basis of the scope throughout this specification.

Since combinations of blocks of the accompanying block diagrams and operations of flowcharts may be performed by computer program instructions (execution engines) and the computer program instructions may be embedded in processors of general purpose computers, special purpose computers, or other programmable data processing apparatuses, the instructions that are executed by the processors of the computers or other programmable data processing apparatuses generate means for performing functions described in the blocks of the block diagrams or the steps of the flowcharts.

Since the computer program instructions may be stored in computer usable or readable memories capable of being used in computers or other programmable data processing apparatuses to realize functions in particular manners, manufacturing items that the instructions stored in the computer usable or computer readable memories include instruction parts configured to perform the functions described in the blocks of the block diagrams or the operations of the flowcharts may be produced.

In addition, since the computer program instructions may be embedded in the computers or other programmable data processing apparatuses, the instructions, which perform a series of operations in the computers or the other programmable data processing apparatuses to generate computer-executed processes and execute the computers or the other programmable data processing apparatuses, may also provide operations for executing the functions described in the blocks of the block diagrams and the operations of the flowcharts.

In addition, the blocks or operations may represent portions of modules, segments, or codes including one or more executable instructions for executing specified logical functions, and in some alternative embodiments, the functions described in the blocks or operations may also be performed out of order. For example, two blocks or operations which are sequentially described may also be simultaneously performed, or the blocks or operations may also be performed in reverse order of the corresponding functions as necessary.

Hereinafter, embodiments of the present invention will be described in detail with reference to the accompanying drawings. However, the embodiments of the present invention which will be described below may be modified in several different forms, and the scope of the present invention is not limited to the embodiments to be described below. The embodiments of the present invention are provided to fully explain the present invention for those skilled in the art.

Figure 1:
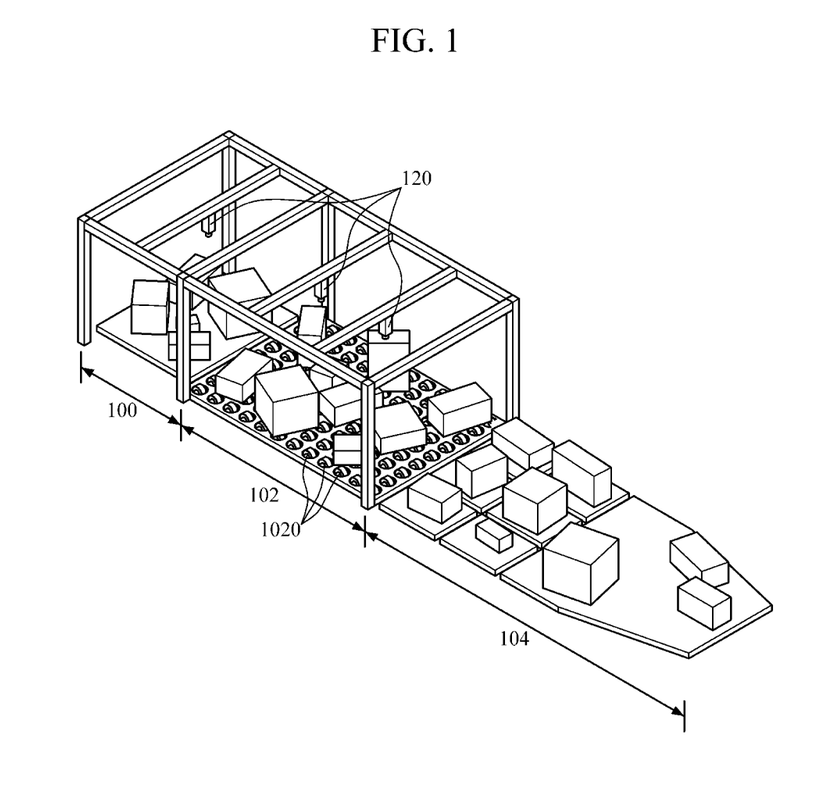
FIG. 1 is a conceptual view illustrating a singulator according to one embodiment of the present invention.

FIG. 1 is a conceptual view illustrating a singulator according to one embodiment of the present invention.

Referring to FIG. 1, a singulator 1 is an apparatus configured to sequentially arrange articles randomly supplied and delivered without any rules before inputting the articles into an automated article separator, and discharge the articles to the automated article separator in a distribution center and the like.

The singulator 1 is formed as transfer apparatuses having a long shape and configured to transfer the articles in a running direction in terms of a mechanism. The transfer apparatuses may be conveyors. The singulator 1 includes a feeding unit 100, an arranging unit 102, and a coupling unit 104 in terms of functionality. The transfer apparatuses on the feeding unit 100, the arranging unit 102, and the coupling unit 104 on may be divided by functionality, and here, transfer speeds of the transfer apparatuses may be differently controlled. When the feeding unit 100 randomly supplies articles to the transfer apparatus, the arranging unit 102 does not stop the supplied articles and transfers the articles using the transfer apparatus while sequentially arranging the articles in one or more rows. The coupling unit 104 couples the articles arranged by the arranging unit 102 into a row. For example, when the arranging unit 102 divides the articles into two or more rows and arranges the articles in a first order, the coupling unit 104 couples the articles arranged in two or more rows into a row and arranges the articles a final discharge order.

The singulator 1 according to one embodiment may be miniaturized and may intelligently arrange articles because a mechanical apparatus is combined with an information technology (IT) such as a computer vision technology. An example of the computer vision technology is that images of articles are captured by image capturing units 120 such as a camera illustrated in FIG. 1, and positions and postures of the articles are recognized using the captured images in real time. The positions and the postures of the articles may be recognized using the images, and the articles and the transfer apparatuses may be controlled using the recognized information to control the positions and the postures of the articles. In addition, since a large quantity of articles may be processed, an installation area can be decreased, and performance thereof can be improved. As described above, the singulator 1 in which a size is minimized and a throughput per hour for arranging articles is maximized by being combined with a software (S/W) technology such as an image processing technology that does not have limitations of a simple mechanical apparatus is proposed.

The arranging unit 102 uses a plurality of direction changing apparatuses 1020 to arrange articles. The direction changing apparatuses 1020 may have cell forms and are transversely and lengthily disposed as illustrated in FIG. 1. The direction changing apparatuses 1020 are not used to divide articles or change flows of already arranged articles, but are used to arrange articles which are not arranged, are irregularly and randomly mixed and supplied. To this end, the arranging unit 102 controls the direction changing apparatuses 1020 one at a time or in groups to control moving directions of the articles irregularly supplied to make regular flows.

Figure 2:
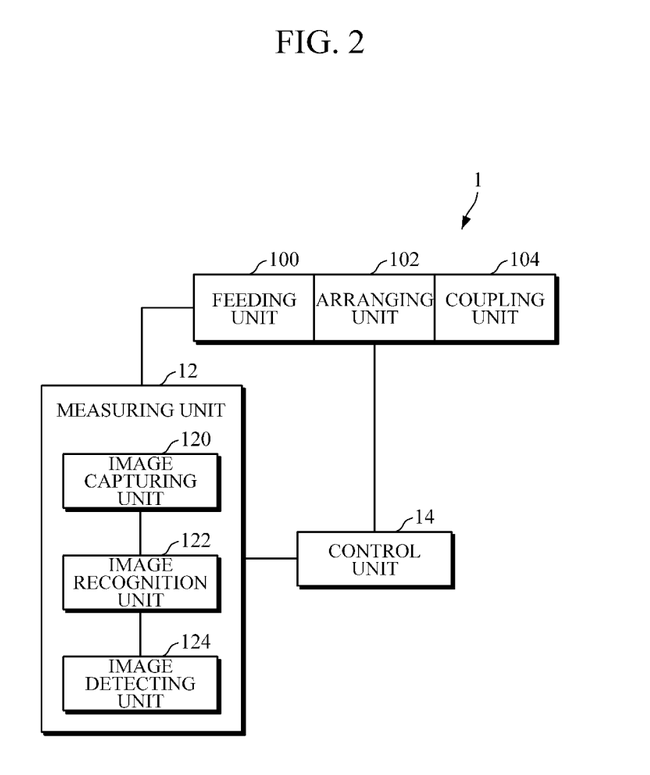
FIG. 2 is a block diagram illustrating a configuration of the singulator according to one embodiment of the present invention.

FIG. 2 is a block diagram illustrating a configuration of the singulator according to one embodiment of the present invention.

Referring to FIG. 2, the singulator 1 includes the feeding unit 100, the arranging unit 102, the coupling unit 104, a measuring unit 12, and a control unit 14.

The measuring unit 12 measures a position and a posture of an article being transferred. The posture includes a direction of the article. The measuring unit 12 according to one embodiment may include image capturing units 120 and an image recognition unit 122 and may further include a position detecting unit 124.

The image capturing unit 120 captures an image of an article being transferred. The image capturing unit 120 may be a camera, and the number of cameras is not specifically limited. The image capturing unit 120 receives image signals of articles being transferred, converts the image signals into electrical signals, and trans***mits the electrical signals to the image recognition unit 122. As illustrated in FIG. 1, the image capturing unit 120 is supported by a support and installed at an upper end of the singulator 1. As illustrated in FIG. 1, the image capturing units 120 may be installed at upper ends of the feeding unit 100 and the arranging unit 102 of the singulator 1 and capture images.

The image recognition unit 122 recognizes positions and postures of articles by analyzing images captured by the image capturing units 120. The image recognition unit 122 may read positions of a large number of articles being transferred and trace transfer positions and postures of the articles in real time using an image processing and recognition technology. To this end, the image recognition unit 122 may detect an object from image data and detect a position and a posture of an article from the detected object. Although an object recognition technology using an image works in limited environments, the image recognition technology may be used to improve efficiency of automation. Since the image processing requires a large amount of calculations, a real time processing is not easy, but a parallel process and a graphic processing unit (GPU) may be used to control the singulator 1 in real time on the basis of a measured result in real time. As the image recognition unit 122 according to one embodiment sequentially assigns numbers to recognized articles, the control unit 14 may sequentially sort the articles when individually controlling the articles.

The position detecting unit 124 may detect a transfer position of an article on the transfer apparatus, and may be a position detecting sensor. When the position detecting unit 124 detects a transfer position at which an article is positioned, the image capturing unit 120 may acquire more accurate position information from an image of the article positioned at the corresponding position.

The feeding unit 100 randomly supplies articles to the transfer apparatus. The arranging unit 102 receives the articles randomly supplied by the feeding unit 100 and changes moving directions of the articles using the plurality of direction changing apparatuses to arrange the articles in an orderly manner while transferring the articles using the transfer apparatus. When the arranging unit 102 divides articles into two or more rows and arranges the articles in a first order, the coupling unit 104 couples the articles arranged in the two or more rows into one row and arranges the articles in a final discharge order.

Although a speed of the transfer apparatus may be controlled such that the arranging unit 102 directly discharges articles in a row without the coupling unit 104, the speed at a front portion of the arranging unit 102 may not be decreased in order to increase a speed of processing, and then, the separate coupling unit 104 may be used. The coupling unit 104 couples articles arranged in a plurality of rows by the arranging unit 102 into a row to be spaced a predetermined distance from each other.

The coupling unit 104 according to one embodiment arranges the articles into a row by dividing the transfer apparatus in the coupling unit 104 into a plurality of rows and driving the transfer apparatuses at different transfer speeds. For example, the coupling unit 104 includes a first transfer apparatus configured to transfer articles at a first speed in a first flow, a second transfer apparatus configured to transfer articles at a second speed in a second flow, and a third transfer apparatus configured to transfer articles at a third speed in a third flow. Here, the coupling unit 104 unifies the articles being transferred in the first flow and the articles being transferred in the second flow with the articles being transferred in the third flow and sequentially transfers the articles in the third flow in a row according to a control command Here, the first speed may be higher than the second speed to perform the coupling. For another example, the coupling unit 104 may also arrange articles into a row using a blocking unit configured to block the articles from being transferred in a specific direction.

The control unit 14 receives an image recognition result from the measuring unit 12 and tran***smits a control command to the transfer apparatus. To this end, the control unit 14 transfers the articles without stopping the articles randomly input using the transfer apparatus, and controls the direction changing apparatuses one at a time or in groups to arrange flows of the articles according to information measured by the measuring unit 12. Here, the control unit 14 may arrange the flows of the articles such that the articles may be discharged in a plurality of rows from a discharge port of the arranging unit 102. A detailed structure of the control unit 14 will be described in detail with reference to FIG. 3.

The image recognition unit 122 and the control unit 14 may be embedded in a computer. The control unit 14 may control operation of the transfer apparatus, and may be a form of a central control unit, an operating control server, or a combination thereof.

Figure 3:
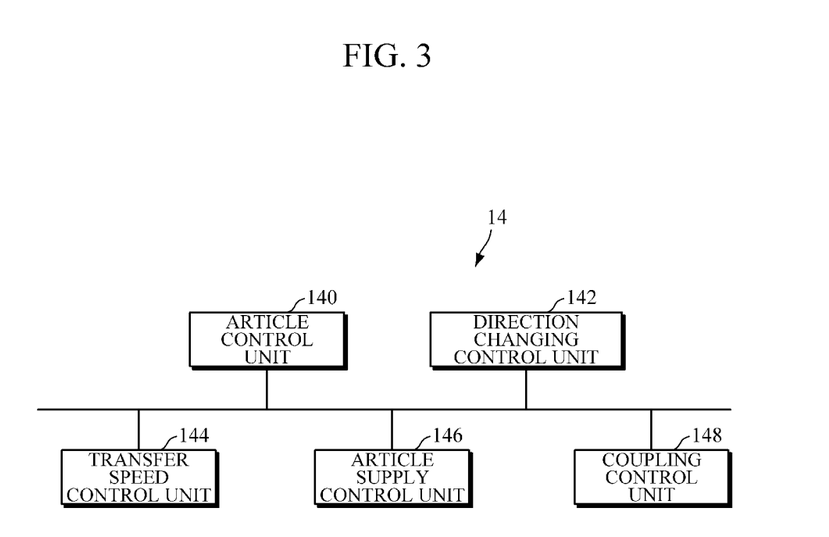
FIG. 3 is a detailed block diagram illustrating a configuration of a control unit of FIG. 2 according to one embodiment of the present invention.

FIG. 3 is a detailed block diagram illustrating a configuration of the control unit of FIG. 2 according to one embodiment of the present invention;

Referring to FIGS. 2 and 3, the control unit 14 may include an article control unit 140, a direction changing control unit 142, and a transfer speed control unit 144, and may further include an article supply control unit 146 and a coupling control unit 148.

The article control unit 140 determines moving directions of articles such that the articles are sequentially arranged and discharged using information measured by the measuring unit 12. The article control unit 140 according to one embodiment extracts an input order of the articles and distances between the articles from position information of the articles measured by the measuring unit 12 and determines the moving directions of the articles from the extracted information. Here, the article control unit 140 may prevent the articles from colliding into each other by changing a direction of a first article being transferred along the transfer apparatus into a first direction and changing a direction of a second article positioned within a preset distance from the first article into a second direction. Here, the first direction may be a left side and the second direction may be a right side. For example, the article control unit 140 moves one article being transferred to the left side, and also moves an article just adjacent to or behind the one article to the right side.

The article control unit 140 according to one embodiment divides the arranging unit 102 into a plurality of rows and arranges directions of articles according to positions of the articles such that articles positioned within a first region in a direction perpendicular to a transfer direction are moved along a first row and articles positioned within a second region adjacent to the first region in the direction perpendicular to the transfer direction are moved along a second row. For example, in a case in which the transfer direction of articles is a transversal direction, the transfer apparatus is divided into three regions in a longitudinal direction, articles positioned within a first region located at an upper end of the transfer apparatus are moved to a left side, articles positioned within a second region located at a center thereof are moved to a center thereof, and articles positioned within a third region located at a lower end thereof are moved to a right side. The article control unit 140 may determine the moving directions of the articles such that the articles are laterally spread and arranged according the positions of the articles.

The article control unit 140 may change a position of an article when the article is transferred and may also change a posture thereof. For example, the article control unit 140 may change a posture of an article such that a narrow surface of the article faces a front surface of the transfer apparatus and a long surface thereof faces a side surface of the transfer apparatus.

The direction changing control unit 142 controls direction changing of the direction changing apparatuses one at a time or in groups such that articles are moved in moving directions determined by the article control unit 140. The transfer speed control unit 144 controls a transfer speed of the transfer apparatus of the arranging unit 102 for an arrangement. Therefore, since moving directions of moving articles may be changed and speeds thereof may also be changed, best performance may be realized regardless of an arrangement status of the articles.

The article supply control unit 146 performs control such that, when the number of expected discharged articles in consideration of sizes (lengths) and the number of articles supplied by the feeding unit 100 is greater than a preset maximum number of discharged articles, a speed of the transfer apparatus is decreased in order to decrease the number of articles supplied per unit time. Alternatively, the article supply control unit 146 performs control such that, when the number of expected discharged articles is less than the predetermined minimum number of discharged articles, the speed of the transfer apparatus is increased in order to increase the number of articles supplied per unit time. The number of expected discharged articles may be the number of articles discharged through the arranging unit 102 or coupling unit 104. Performance and efficiency of the singulator may be maintained by controlling the number of supply articles corresponding to the number of expected discharged articles.

The coupling control unit 148 controls articles to be coupled in a row using the coupling unit 104. For example, the coupling control unit 148 arranges articles into a row by driving the transfer apparatuses divided into a plurality of rows at different transfer speeds and using the difference in speed.

Figure 4:
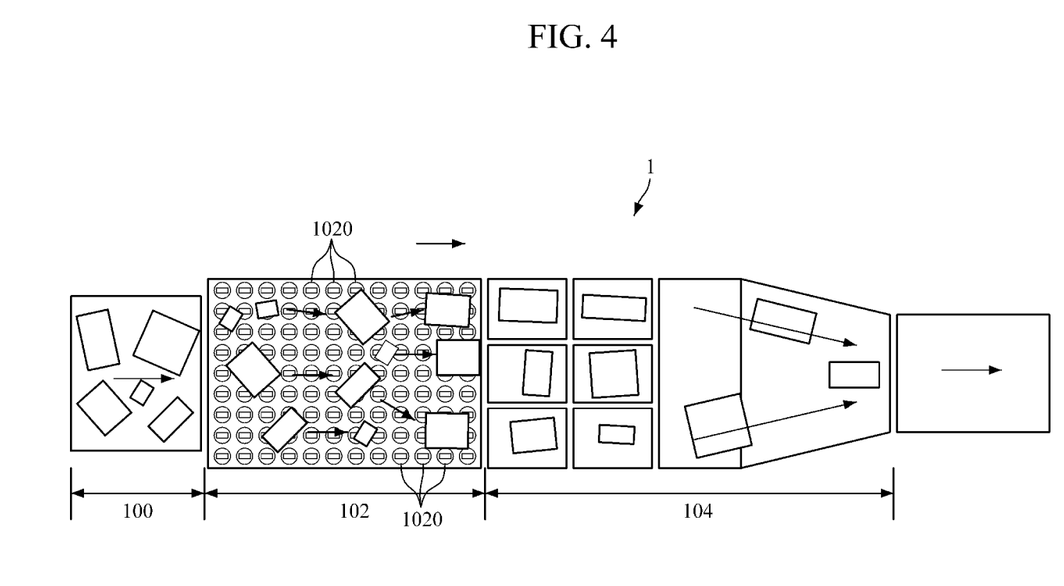
FIG. 4 is a plan view illustrating the singulator according to one embodiment of the present invention.
Figure 5:
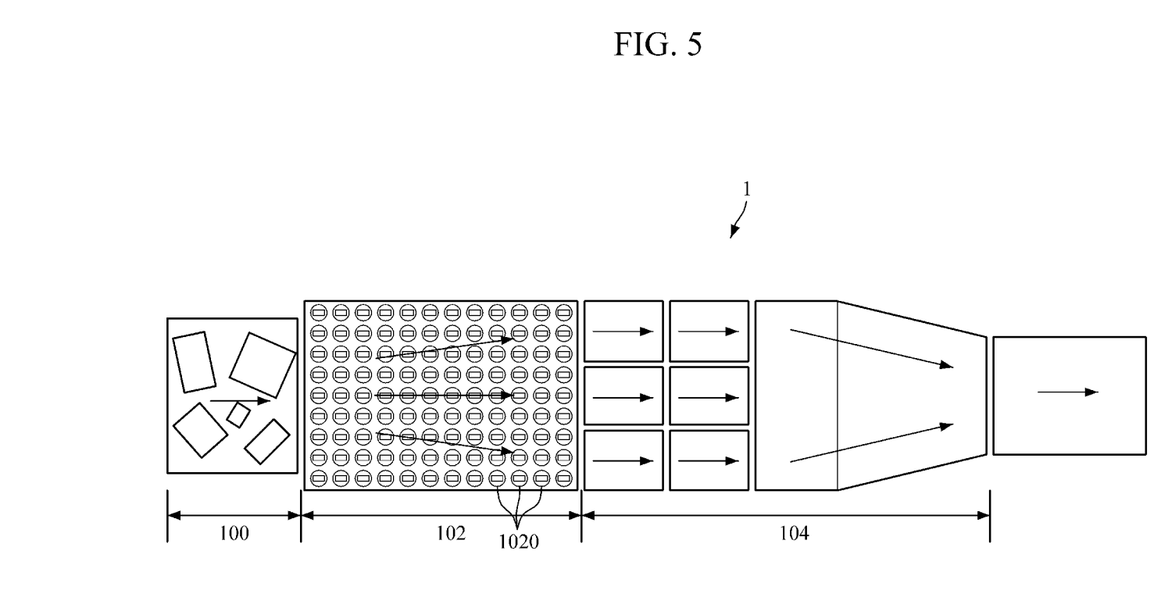
FIG. 5 is a view illustrating a flow of a transfer apparatus of the singulator according to one embodiment of the present invention.
Figure 6:
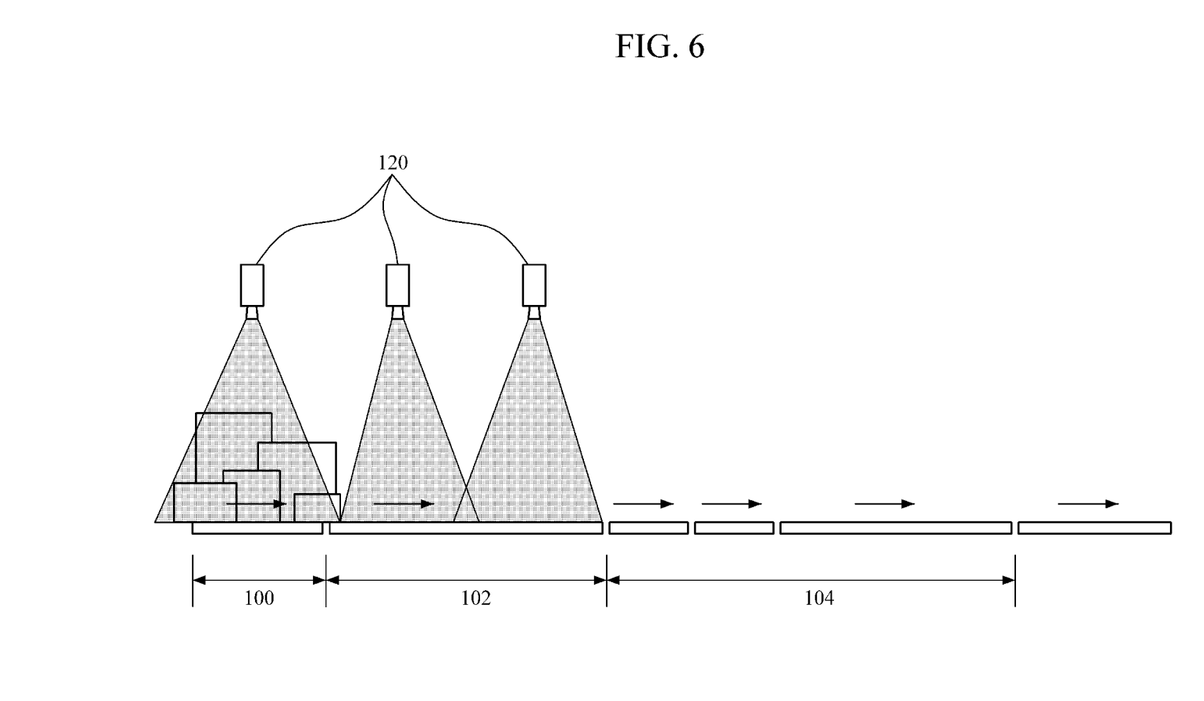
FIG. 6 is a side configuration diagram of the singulator according to one embodiment of the present invention.

FIG. 4 is a plan view illustrating the singulator according to one embodiment of the present invention, FIG. 5 is a view illustrating a flow of the transfer apparatus of the singulator according to one embodiment of the present invention, and FIG. 6 is a side configuration diagram of the singulator according to one embodiment of the present invention;

Referring to FIGS. 4 to 6, when the feeding unit 100 randomly supplies articles to the transfer apparatus, the arranging unit 102 arranges the articles in one or more rows while transferring the articles using transfer apparatus, and the image capturing unit 120 and the direction changing apparatus 1020 are used for an arrangement. The coupling unit 104 couples and discharges the articles arranged by the arranging unit 102 into a row.

Figure 7:
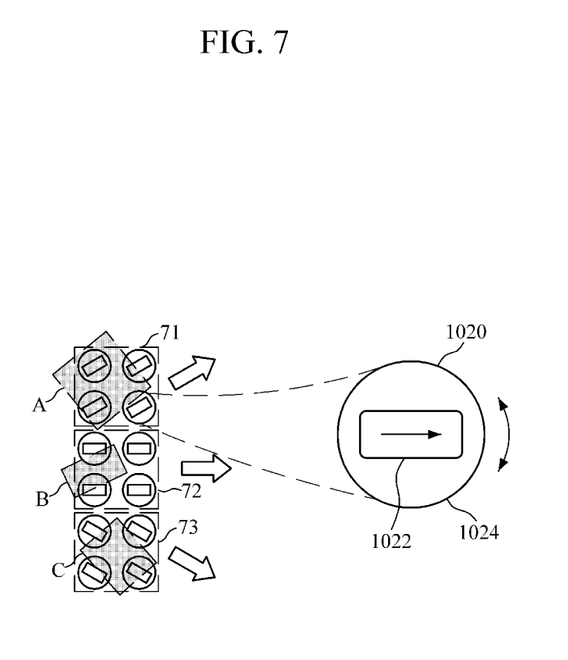
FIG. 7 is a reference view showing an example of an article arrangement using an individual control or group control of direction changing apparatuses according to one embodiment of the present invention.

FIG. 7 is a reference view showing an example of an article arrangement using an individual control or group control of the direction changing apparatuses according to one embodiment of the present invention.

Since the plurality of direction changing apparatuses 1020 are divided into cells and disposed, the direction changing apparatuses 1020 may be controlled one at a time or in groups. The direction changing apparatuses 1020 according to one embodiment extends beyond outer and inner surfaces of the transfer apparatus. In this case, protruding portions of the direction changing apparatuses 1020, which extend beyond the outer surface or an upper surface of the transfer apparatus, support articles being transferred on the transfer apparatus. Protruding portions of the direction changing apparatuses 1020, which extend beyond the inner surface or a lower surface of the transfer apparatus, are rotated by driving motors below the transfer apparatus.

While the direction changing apparatuses 1020 is rotated in a running direction by the driving motors, the direction may be changed into a direction inclined from or perpendicular to the running direction when viewed from above. For example, moving directions of articles may be spread in a lateral direction perpendicular to the running direction. Here, the direction changing of the direction changing apparatuses 1020 may be controlled one at a time or in groups.

A shape of the direction changing apparatuses 1020 is not specifically limited. For example, the direction changing apparatuses 1020 may be manufactured in a pop-up sorter or a wave sorter form. In the case of the wave sorter, the direction changing apparatuses 1020 may move articles leftward and rightward to arrange the articles.

The direction changing apparatuses 1020 may be rollers capable of changing directions into directions inclined from or perpendicular to running directions when viewed from above while rotating. For another example, the direction changing apparatuses include rolling wheels 1022 and rotating bodies 1024 configured to rotate directions of the wheels 1022 such that articles are transferred in directions inclined from or perpendicular to a running direction of the transfer apparatus. As illustrated in FIG. 7, since the rotating body 1024 rotates leftward and rightward when viewed from above, a moving direction of an article moved on the wheel 1022 is changed. Although it is illustrated that the direction changing apparatus has one wheel in FIG. 7, the direction changing apparatus may include a plurality of wheels, and the plurality of wheels may be controlled in groups.

An example of control of the direction changing apparatus will be described below with reference to FIG. 7. The rotating bodies 1024 of a first direction changing apparatus group 71 located at two upper rows of the direction changing apparatuses rotate leftward to move article A placed on the first group 71 leftward, the rotating bodies 1024 of a second direction changing apparatus group 72 located at two rows below the two upper rows of the direction changing apparatuses move article B placed on the second group 72 without changing the transfer direction, and the rotating bodies 1024 of a third direction changing apparatus group 73 located at two lowermost rows of the direction changing apparatuses rotate rightward to move article C placed on the third group 73 rightward. As described above, articles may be arranged by individual or group control of the direction changing apparatuses 1020. An example with reference to FIG. 7 is an example of an arrangement of articles transferred along different divided lines, and the articles may also be arranged through a method in which, among the articles to be transferred along the same line, articles initially input are moved to a left side, and next articles are moved to a right side. The above embodiments are examples to only facilitate understanding, and the present invention is not limited thereto.

Figure 8:
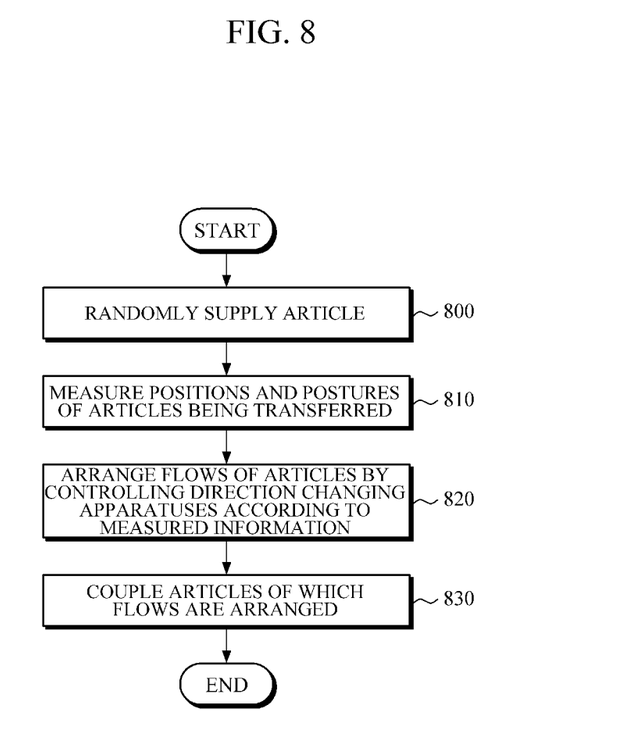
FIG. 8 is a flowchart illustrating an automated article singulating method according to one embodiment of the present invention.

FIG. 8 is a flowchart illustrating an automated article singulating method according to one embodiment of the present invention.

Referring to FIG. 8, the singulator receives articles randomly supplied for an arrangement and measures positions and postures of the articles being transferred while transferring the articles (810). To this end, the singulator may acquire images of the articles and recognize the positions and the postures of the articles from the acquired images. In addition, since transfer positions at which the articles are positioned are detected, the singulator may acquire more accurate position information from the images of the articles positioned at the corresponding positions.

Then, the direction changing apparatuses are controlled one at a time or in groups to arrange flows of the articles (820). In the operation of the article flow arrangement (820), the singulator according to one embodiment determines moving directions of the articles using the measured information such that the articles are sequentially arranged and discharged. In addition, the singulator controls direction changing of the direction changing apparatuses one at a time or in groups such that the articles are moved in the determined moving directions. Here, a transfer speed of the transfer apparatus may be controlled for an arrangement.

When the moving directions of the articles are determined, the singulator may extract an input order of the articles and distances between the articles from position information of the articles and determine the moving directions of the articles using the extracted information. For another example, the transfer apparatus is divided into a plurality of rows, articles positioned within a first region in a direction perpendicular to a transfer direction are moved along a first row, and articles positioned within a second region adjacent to the first region in the direction perpendicular to the transfer direction are moved along a second row. Here, the singulator may determine the moving directions of the articles according to the positions of the articles such that the articles are laterally spread and arranged. The singulator may arrange the articles while changing postures of the articles to have preset postures for when the articles are transferred.

The singulator may randomly supply the articles to the transfer apparatus (800) before the operation of the article flow arrangement (820). Here, the singulator may perform control such that, when the number of expected discharged articles in consideration of sizes (lengths) and the number of supplied articles is greater than a preset maximum number of discharged articles, a speed of the transfer apparatus is decreased in order to decrease the number of articles supplied per unit time, and when the number of expected discharged articles is less than a preset minimum number of discharged articles, the speed of the transfer apparatus is increased in order to increase the number of articles supplied per unit time.

The singulator may couple the articles arranged in two or more rows into a row (830) and arrange the articles in a final discharge order after the operation of the article flow arrangement (820). During the coupling, the singulator divides the transfer apparatus into a plurality of rows and drives transfer apparatuses at transfer speeds to arrange the articles into a row.

As described above, since a singulator configured to arrange articles is formed by combining a hardware technology mainly including machines with a S/W technology such as a computer vision technology, the singulator can be miniaturized and can intelligently arrange the articles. Here, since a return portion at which articles failed to be arranged are re-input is not necessary, an overall occupying area can be decreased.

A singulator mainly including machines has a big size and limited processing performance. However, a singulator according to one embodiment can recognize positions and postures of articles using images, control the positions and postures of the articles by controlling a conveyer belt and the like using recognized information, and process a large quantity of articles per hour, and thus an installation area can be decreased and performance can be improved. As described above, since the singulator is combined with an image processing technology that does not have the limitation of a simple mechanical apparatus, a size thereof to can be minimized and a processing amount of articles to be arranged per hour can be increased.

Since high-speed/precision/automation technologies are developed and an information technology (IT) is converged thereon in a logistics industry, high-value-added industries having a great ripple effect on front and back industries related to information/intelligence can be generated. A synergy effect can be generated by an interaction among machinery industry, information and communication industry, and logistics industry. Since an artificial intelligence related S/W technology is applied to automated equipment in the singulator at a time at which expectation of full automation is increasing with the development of artificial intelligence technology, technical skills can be secured for a fully automated era. Since the singulator is formed by a technology in which S/W and hardware fields are fused, it is expected to have a positive effect on developing a convergence technology.

While the present invention has been particularly shown and described with reference to exemplary embodiments thereof, it will be understood by those skilled in the art that various changes in form and details may be made therein without departing from the spirit and scope of the embodiments as defined by the appended claims. The exemplary embodiments should be considered in descriptive sense only and not for purposes of limitation. Therefore, the scope of the embodiments is defined not by the detailed description of the embodiments but by the appended claims, and all differences within the scope will be construed as being included in the present invention.

What is claimed is:

1. A singulator comprising:
    a measuring unit configured to measure positions and postures of articles being transferred;
    an arranging unit configured to receive randomly supplied articles, transfer the articles using a transfer apparatus, and change moving directions of the articles using rotation of at least one wheel included in each of direction changing apparatuses; and
    a control unit configured to control the direction changing apparatuses one at a time or in groups to arrange flows of the articles according to information measured by the measuring unit,
    wherein the control unit comprises an article control unit configured to prevent the articles from colliding into each other by controlling distances between the articles and spread the articles in a lateral direction perpendicular to a running direction while transferring the articles for an article arrangement.

2. The singulator of claim 1, wherein the control unit includes:
    the article control unit configured to determine the moving directions of the articles using the information measured by the measuring unit to sequentially arrange and discharge the articles;
    a direction changing control unit configured to control direction changing of the direction changing apparatuses one at a time or in groups to move the articles in the determined moving directions; and
    a transfer speed control unit configured to control a transfer speed of the transfer apparatus for an arrangement.

3. The singulator of claim 2, wherein the article control unit extracts an input order of the articles and distances between the articles from position information of the articles measured by the measuring unit and determines the moving directions of the articles using the extracted information.

4. The singulator of claim 3, wherein the article control unit prevents the articles from colliding into each other by changing a moving direction of a first article being transferred along the transfer apparatus into a first direction and changing a moving direction of a second article positioned within a preset distance from the first article into a second direction.

5. The singulator of claim 2, wherein the article control unit arranges the moving directions of the articles according to the positions of the articles such that, after the arranging unit is divided into a plurality of rows, articles positioned within a first region in a direction perpendicular to a transfer direction are moved along a first row of the arranging unit and articles positioned within a second region adjacent to the first region in the direction perpendicular to the transfer direction are moved along a second row of the arranging unit.

6. The singulator of claim 2, wherein the article control unit determines the moving directions of the articles to laterally spread the articles and arrange the articles according to the positions of the articles.

7. The singulator of claim 2, wherein the article control unit changes the postures of the articles into preset postures for when the articles are transferred, and arranges the articles.

8. The singulator of claim 1, wherein each of the direction changing apparatuses includes a roller configured to rotate and change a direction to a direction inclined from or perpendicular to a running direction of the transfer apparatus.

9. The singulator of claim 1, wherein each of the direction changing apparatuses includes:
   at least one wheel configured to be rollable; and
   a rotating body configured to change a direction of the at least one wheel to move the articles in a direction inclined from or perpendicular to a running direction of the transfer apparatus.

10. The singulator of claim 1, wherein the measuring unit includes:
    an image capturing unit configured to capture images of the articles; and
    an image recognition unit configured to recognize the positions and the postures of the articles from the captured images.

11. The singulator of claim 10, wherein the measuring unit further includes a position detecting unit configured to detect a transfer position of the article on the transfer apparatus.

12. The singulator of claim 1, further comprising a feeding unit configured to randomly supply the articles to the transfer apparatus,
    wherein the control unit performs control such that, when the number of expected discharged articles in consideration of sizes and the number of supplied articles is greater than a preset maximum number of discharged articles, a speed of the transfer apparatus is decreased in order to decrease the number of articles supplied per unit time, and when the number of expected discharged articles is less than a preset minimum number of discharged articles, the speed of the transfer apparatus is increased in order to increase the number of articles supplied per unit time.

13. The singulator of claim 1, further comprising, when the arranging unit divides the articles into two or more rows and arranges the articles in a first order, a coupling unit configured to couple the articles arranged in the two or more rows into one row and arrange the articles in a final order.

14. The singulator of claim 13, wherein the coupling unit divides the transfer apparatus into a plurality of transfer apparatuses in rows, drives the transfer apparatuses at different transfer speeds, and arranges the articles into a row.

15. An automated article singulating method, the method comprising:
    receiving, by a singulator, randomly supplied articles and transferring the articles using a transfer apparatus;
    measuring positions and postures of the articles being transferred; and
    arranging flows of the articles by controlling rotation of at least one wheel included in each of direction changing apparatuses one at a time or in groups according to the measured information,
    wherein the arranging of the flows of the articles comprises preventing the articles from colliding into each other by controlling distances between the articles and spreading the articles in a lateral direction perpendicular to a running direction while transferring the articles.

16. The method of claim 15, wherein the arranging of the flows of the articles includes:
    determining moving directions of the articles using the measured information to sequentially arrange and discharge the articles;
    controlling direction changing of the direction changing apparatuses one at a time or in groups to move the articles in the determined moving direction; and
    controlling a transfer speed of the transfer apparatus for an arrangement.

17. The method of claim 16, wherein the determining of the moving directions of the articles includes:
    extracting an input order of the articles and distances between the articles from the measured position information of articles; and
    determining the moving directions of the articles using the extracted information.

18. The method of claim 16, wherein the determining of the moving directions of the articles includes:
    dividing the transfer apparatus into a plurality of rows;
    moving articles positioned within a first region in a direction perpendicular to a transfer direction along a first row according positions of the articles; and
    moving articles positioned within a second region adjacent to the first region in the direction perpendicular to the transfer direction along a second row.

19. The method of claim 16, wherein the determining of the moving directions of the articles includes determining the moving directions of the articles to laterally spread the articles and arrange the articles according to the positions of the articles.

20. The method of claim 16, wherein the determining of the moving directions of the articles includes changing the postures of the articles into preset postures for when the articles are transferred and arranging the articles.

21. The method of claim 15, further comprising:
    randomly supplying the articles to the transfer apparatus; and
    performing control such that, when the number of expected discharged articles in consideration of sizes and the number of supplied articles is greater than a preset maximum number of discharged articles, a speed of the transfer apparatus is decreased in order to decrease the number of articles supplied per unit time, and when the number of expected discharged articles is less than a preset minimum number of discharged articles, the speed of the transfer apparatus is increased in order to increase the number of articles supplied per unit time.

22. The method of claim 15, further comprising coupling the articles arranged in two or more lines into one row and arranging the articles in a final discharge order.

* * * * *